United States Patent [19]
Stotz

[11] 3,771,813
[45] Nov. 13, 1973

[54] WHEEL SUSPENSION FOR INDIVIDUALLY SUSPENDED VEHICLE WHEELS

[75] Inventor: Erich Stotz, Rummelshausen, Germany

[73] Assignee: Dr. -Ing. h.c.F. Porsche KG, Stuttgart-Zuffenhausen, Germany

[22] Filed: Dec. 15, 1971

[21] Appl. No.: 208,226

[30] Foreign Application Priority Data
Dec. 16, 1970 Germany.................. P 20 61 909.4

[52] U.S. Cl. .......... 280/124 A, 267/20 A, 267/15 R
[51] Int. Cl............................................. B62d 17/00
[58] Field of Search .................... 280/124 R, 124 A; 267/20 A, 20 R, 20 C, 15 R, 15 A, 22 R, 22 A, 34, 60

[56] References Cited
UNITED STATES PATENTS
2,866,651  12/1958  Powell ........................... 267/20 A
2,998,265  8/1961  Kozicki ........................... 267/20 R
2,760,783  8/1956  Keith ................................. 267/60
1,769,503  7/1930  Feyens ............................ 267/20 R Primary Examiner—Philip Goodman
Assistant Examiner—John A. Carroll
Attorney—Paul M. Craig, Jr. et al.

[57] ABSTRACT

A wheel guide system for individually suspended wheels of motor vehicles which are guided by a wheel guide member and in which the wheels are supported with respect to the vehicle frame by spring means; the guide member is pivotally secured for universal movement at the vehicle frame and/or at the wheel carrier while the wheel carrier includes a guide arm arranged at a distance to the guide member, by means of which the wheel carrier is guided in a curved track secured at the vehicle body.

25 Claims, 3 Drawing Figures

PATENTED NOV 13 1973 3,771,813

WHEEL SUSPENSION FOR INDIVIDUALLY SUSPENDED VEHICLE WHEELS

The present invention relates to a wheel suspension for individually suspended wheels of motor vehicles, guided by means of a ghide member, in which the wheels are supported with respect to the vehicle frame by way of spring means, and in which the guide members are secured on the side of the wheel at a wheel carrier of the wheel and on the side of the vehicle at the vehicle frame.

Wheel guide systems for individually suspended vehicle wheels have to be so constructed and designed that they can be manufactured in a simple and cost-saving manner and assure a safe driving behavior of the vehicle in every driving condition.

In order to attain good driving properties for a vehicle, it is important to pivotally connect the wheels at the vehicle body in such a manner that they exhibit camber and track changes during the inward or outward spring deflection which are as small as possible. Such a wheel suspension is already known in the German Patent 512,297. This patent discloses a wheel guide system in which the guide arms of the individual wheels are guided perpendicularly to the vehicle longitudinal axis in a guide means of the vehicle body. Even though a constant track width of the wheels is realized thereby during the inward or outward spring deflection, the camber setting of the wheel changes in this prior art suspension during the inward or outward spring deflection of the wheels whereby, when driving through curves, a positive camber of the wheel on the outside of the curve is established as a result of the inclination of the vehicle body and/or of the inward spring deflection of the wheel on the outside of the curve so that the support function of this wheel is reduced and the vehicle goes into skidding already at relatively small curve speeds. In order to prevent this disadvantage, wheel suspensions are also known in which the wheels are suspended by means of a cross guide member and a spring leg connected therewith (German Offenlegungsschrift 1,480,439). In this construction, the spring leg is retained at the vehicle body. During an inward spring deflection of a wheel, the camber adjustment is changed only minimally because the spring leg takes over a guide function for the wheel. However, when driving through curves, the point of pivotal connection of the spring let on the side of the body is displaced toward the outside of the curve as a result of the tilting of the vehicle body, whence the vehicle wheel also assumes a more positive camber position and the adherence of the wheels is reduced thereby.

In contradistinction thereto, the aim of the present invention resides in providing a wheel suspension and wheel guide system for individually suspended wheels of motor vehicles, in which the vehicle wheel always maintains a negative predetermined camber during the inward and outward spring deflections and/or during an inclination of the vehicle body, for example, when driving rapidly through curves.

The underlying problems are solved according to the present invention in that the guide member absorbing the shearing and tensional forces as well as the lateral forces is pivotally supported at the vehicle frame and/or at the wheel carrier for universal movement, whereby the wheel carrier includes a guide arm arranged at the distance with respect to the guide member, by means of which the wheel carrier is guided in a curved track secured at the vehicle body. Advantageously, the guide arm of the wheel carrier consisting of light-metal is guided in the curved track by means of a sliding body. It is appropriate that the guide arm of the wheel carrier is constituted by a removable bearing bolt for the mounting of the sliding body. It is of particular advantage that the sliding body is constructed as spherically shaped roller and consists of synthetic material of the class of polyurethane. A further advantage resides in that the curved track secured at the vehicle frame is constituted by an independent housing which is detachably secured at the vehicle frame, whereby the housing is constructed two-partite and the housing halves thereof form the shape of the curved track and receive, placed against one another, the spherically shaped roller of the guide arm. It is of particular advantage that the shape of the curved track is constructed corresponding to the respective, intended vehicle use. Advantageously, the guide member includes an adjusting mechanism for adjusting the toe-in, which is arranged within the area of the whel carrier. Appropriately, the adjusting mechanism consists of a screw or bolt arranged at right angle to the wheel axis and guided in the guide member. The screw or bolt is thereby connected with an elastic bush and surrounds a part of the wheel carrier elastically supported in the guide member. A further advantage is the fact that the end of the guide member on the side of the frame is constructed Y-shaped and is pivotally as well as elastically connected at a cross bearer of the vehicle frame essentially perpendicularly to the vehicle longitudinal axis whereby the leg portions of the Y-shaped guide member end partially surround the cross bearer. Advantageously, the elastic bearing support of the guide member at the cross bearer of the vehicle frame and/or at the wheel carrier is constituted by rubber members which are under prestress.

The advantages achieved with the present invention consist in particular in that as a result of the described features, a wheel suspension and guidance for individually suspended vehicle wheels is realized in which the vehicle wheel is guided on a guide member and by the use of a guide arm retains the camber adjustment in a predetermined position during the inward and outward spring deflection of the wheel and/or during the inclination of the vehicle body when driving through curves. As a result thereof, good and safe driving characteristics are attained whereby optimum support and guide properties of the chassis are obtained with slight structural expenditures so that also less experienced drivers receive immediately a high degree of safety feel. Additionally, this wheel guidance can be arranged in a space-saving manner whereby an increase in the utilizable luggage or passenger space is obtained.

Furthermore, due to the constant camber position of the vehicle wheels the driving velocity, especially when driving through curves at high speeds, can be maintained up to near the permissive frictional adherence of the vehicle tires so that a wide safety range is attained. By a corresponding configuration of the curved track, the camber of the vehicle wheel can be matched to the respective vehicle use, for example, with sports car for racing purposes, so that with high-speed vehicles, the curved track is so designed that with increasing inward spring deflection of the vehicle wheel, the negative camber position increases whereby additional lateral forces can be absorbed by way of the wheel and therewith very high curve velocities are attainable. Moreover, the unsprung masses of the wheel are kept small by this construction of a wheel suspension and guidance whereby smaller dynamic wheel loads are achieved and, as a result thereof, the roadability as well as the spring-comfort of the vehicle are improved. A simple cost-saving manufacture and, in case of eventual damages, a rapid disassembly is made possible by the described housing construction of the curved track and the detachable fastening thereof at the vehicle body. Additionally, series-produced vehicles can be converted relatively rapidly into sports or rallye vehicles in that the curved track installed during series assembly is interchanged with a curved track producing a more negative camber. Owing to the construction of the slide roller from synthetic material and owing to the bearing support thereof in the guide arm of the wheel carrier, a simple, wear-resistant and far-reachingly service-free mounting and support of the slide roller is obtained. Furthermore, a vibration-damping and service-free pivotal connection is achieved by the described arrangement of the guide member at the vehicle frame and at the wheel carrier, which can be manufactured in a simple manner and can be installed without special work tools and which additionally assures a good guidance of the wheel. The toe-in of each wheel can be adjusted by simple means corresponding to the predetermined values for the vehicle by the arrangement of an adjusting mechanism at the guide member. The adjusting mechanism can be manufactured in a simple and cost-saving manner so that expensive joints, eccentrics, adjusting disks or the like can be dispensed with. The yieldingness of the wheel necessary for the track and/or camber adjustment is constituted by the bearing support of the wheel carrier on the guide member. In order to prevent a track change of the vehicle during the inward or outward spring deflection, the housing forming the curved track is secured at the vehicle body perpendicularly to the vehicle longitudinal axis so that by way of the spherically shaped roller, the wheel carrier always remains in the predetermined track and camber position independently of its pivotal connection on the side of the frame whereby the straight-running properties as well as the curve stability of the vehicle are improved.

These and further objects, features and advantages of the present invention will become more apparent from the following description when taken in connection with the accompanying drawing which shows, for purposes of illustration only, one embodiment in accordance with the present invention, and wherein.

Figure 1:
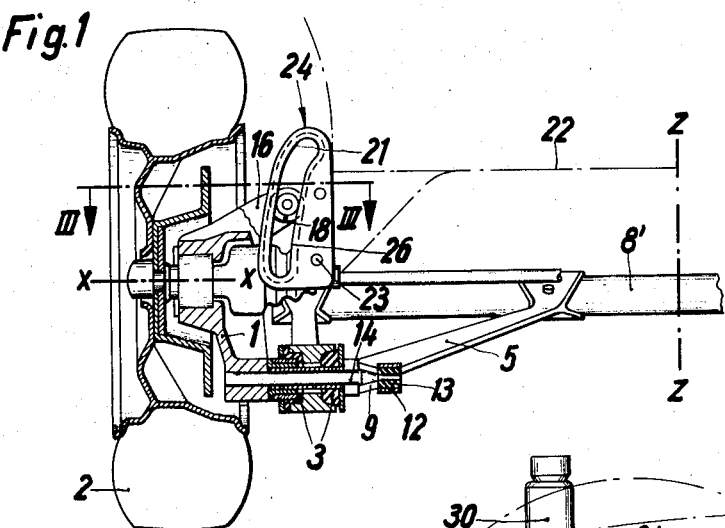
FIG. 1 is a front elevational view on a wheel suspension for an individually suspended vehicle wheel of a motor vehicle with a wheel guidance in accordance with the present invention.
Figure 2:
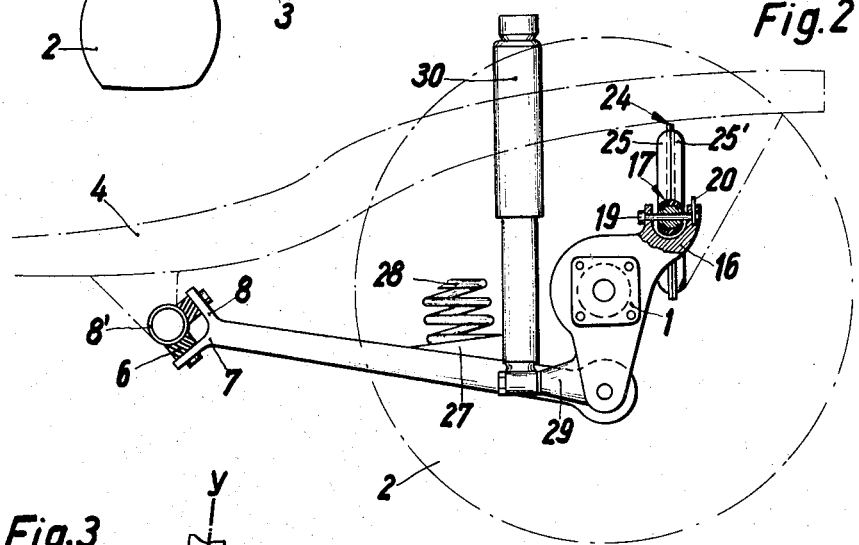
FIG. 2 is a side view of the wheel guidance of FIG. 1, partially in cross section, and with the vehicle wheel removed.
Figure 3:
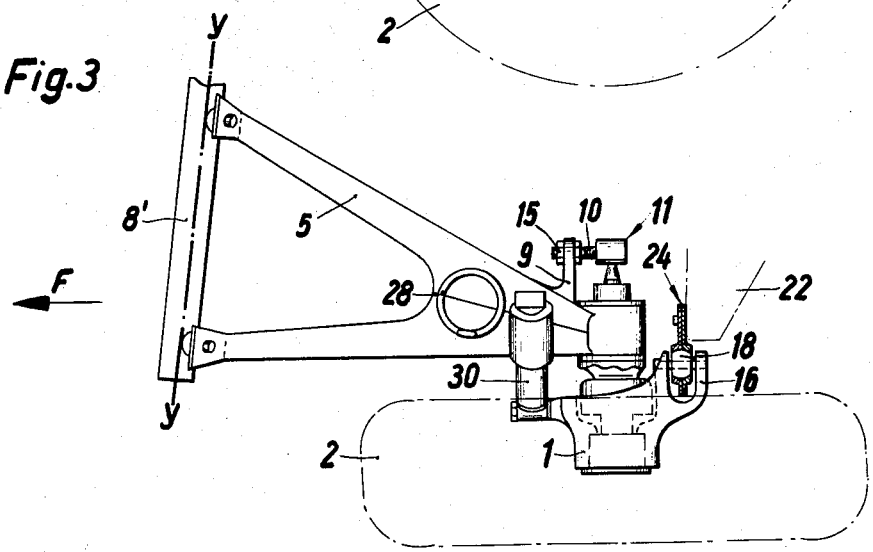
FIG. 3 is a plan view on the wheel guidance with a cross section through the spherical roller of the guide arm, taken along line III—III of FIG. 1.

Referring now the drawing wherein like reference numerals are used throughout the various views to designate like parts, the wheel suspension of a motor vehicle consists essentially of a wheel carrier 1 on which the vehicle wheel 2 is retained and journaled. The wheel carrier 1 is retained below the wheel axis X—X by way of elastic intermediate bearings 3 (FIG. 1) at a triangular guide member 5 supported at the vehicle frame 4. The bearing support of the triangular guide member 5 at the vehicle frame 4 takes place by rubber blocks 6 (FIG. 2) arranged at the fork ends, whose theoretical connecting line forms the pivot axis Y—Y (FIG. 3) of the guide member 5. The places of pivotal connection of the triangular guide member 5 are so arranged that the pivot axis Y—Y extends obliquely against the driving direction F of the vehicle. Each guide member end 7 (FIG. 2) on the side of the frame is constructed Y-shaped whereby the legs 8 pointing in the vehicle driving direction F are secured by conventional means under interposition of rubber blocks 6 at a cross bearer 8' which is rotatably supported at the vehicle frame 4. A bearing lug 9 (FIG. 3) is arranged at the triangular guide member 5 within the area of the bearing support of the triangular guide member 5 on the side of the wheel. The bearing lug 9 serves for the mounting of an adjusting screw 10 (FIG. 3) of an adjusting mechanism generally designated by reference numeral 11. The adjusting mechanism 11 serves for the toe-in adjustment of the wheel 2 and consists of a sleeve 12 (FIG. 1) rigidly connected with the adjusting screw 10. The bush 12 includes an elastic bearing 13 and is mounted on a pin 14 of the wheel carrier 1. For purposes of maintaining constant the toe-in adjustment, nuts 15 (FIG. 3) are screwed on the adjusting screw 10 which clamp the adjusting screw 10 against the bearing lug 9. Above the wheel axis X—X, a part of the wheel carrier 1 is constructed as guide arm 16 (FIGS. 1, 2 and 3). The guide arm 16 includes a fork-shaped end (FIG. 2) and extends in the direction toward the vehicle center Z—Z of the vehicle (FIG. 1). A sliding body generally designated by reference numeral 17 (FIG. 2) which is supported in the guide arm 16 on a bearing bolt 19, is constructed as spherically shaped roller 18 (FIGS. 2 and 3). The bearing bolt 19 is retained in its position in the guide arm 16 against rotation and displacement by a cylindrical pin 20. The ball-shaped guide roller 18 slides in a curved track 21 (FIG. 1) of a housing generally designated by reference numeral 24 (FIGS. 1 and 2 and 3) secured at the vehicle body 22 by means of bolts 23 (FIG. 1). The housing 24 consists of two symmetrical housing halves 25 and 25' (FIG. 2). The curved track 21 is provided in the housing halves 25 and 25' by apertures 26 of semi-circular shape in cross section which, placed one against the other, form the shape of a circle with the diameter of the ball-shaped roller 18. A bracket 27 (FIG. 2) is arranged at the triangular guide member 5 which supports the coil spring 28 serving for the spring-support of the wheel. Furthermore, a mounting means 29 for the fastening of a shock absorber 30 is provided within the area of the wheel carrier 1.

For the assembly of the wheel carrier 1, the latter is at first connected with the triangular guide member 5. This takes place by mounting the elastic intermediate bearings 3 on the wheel carrier 1 and by subsequently mounting and fastening the triangular guide member 5 on the intermediate bearings 3. The thus-preassembled wheel carrier 1 is now secured at the vehicle frame 4 by the use of the guide member end 7 on the side of the frame by the interposition of rubber blocks 6. Thereupon, the already-preassembled husing 24 which consists of the two housing halves 25 and 25' provided with the cam tracks 21 and the spherically shaped roller 18 slidingly enclosed therein, is inserted between the fork-shaped end of the guide arm 16, and the ball roller 18 is secured at the guide arm 16 by means of the bearing bolt 19. Thereafter, the bearing bolt 19 is secured by the cylindrical pin 20. The thus-preassembled wheel carrier 1 is now threadably fastened with respect to the vehicle body 22 by means of the housing 24. Thereafter the coil spring 28 is inserted into the bracket 27 of the triangular guide member 5, and the shock absorber 30 is secured at the mounting means 29 of the wheel carrier 1. After fastening the vehicle wheel 2 on the wheel carrier 1, the vehicle is now ready for operation.

During the inwardly spring deflection of the vehicle wheel 2, the triangular guide member 5 is pivoted in its elastic pivotal connection at the vehicle frame 4 about the pivot axis Y—Y. At the same time, the wheel carrier 1 and therewith the wheel axis X—X is pivoted about the pivot axis Y—Y of the triangular guide member 5. Simultaneously therewith, the vehicle wheel 2 is forced by way of the guide arm 16, owing to the construction of the curved track 21, to maintain its original camber position. This is made possible by the elastic bearing support 3 of the wheel carrier 1 in the triangular guide member 5 in that the forced guide member movement of the triangular guide member 5 is compensated for by the guide arm 16 of the wheel carrier 1, which is guided in the curved track 21. During the outward spring deflection of the vehicle wheel 2, this operation is analogous in the reverse manner.

The curved track 21 can be so constructed and designed that with increasing inward spring deflection of the vehicle wheel 2, the camber position of the wheel 2 increases. Furthermore, the ends of the curved track 21 are so constructed that with corresponding vehicle body tilting, as occurs when driving through curves due to the transverse acceleration, also no camber change of the vehicle wheel 2 occurs. Due to the tilting of the vehicle body 2, the point of pivotal connection on the side of the body, i.e., the curved track 21 of the housing 24 secured at the vehicle body 22 is displaced outwardly in the direction of the centrifugal forces. The correspondingly shaped curved track 21 however, enforces by way of the guide arm 16 a compensation between the tilting of the vehicle body 22 and the inwardly spring-deflected position of the vehicle wheel 2 so that the camber position of the vehicle wheel 2 remains preserved.

Reference to the "vehicle body" hereinabove and in the following claims, of course, includes all types of vehicle constructions, such as those having self-supporting body construction, separate support frames, etc. Hence the term vehicle superstructure is used hereinafter to refer to relatively fixed parts of the vehicle, such as body, frame, self-supporting body stucture, etc.

While I have shown and described only one embodiment in accordance with the present invention, it is understood that the same is not limited thereto but is susceptible of numerous changes and modifications as known to those skilled in the art, and I therefore do not wish to be limited to the details shown and desribed herein but intend to cover all such changes and modifications as are encompassed by the scope of the appended claims.

What I claim is:

1. A wheel suspension for individually suspended wheels of motor vehicles guided by a guide means, in which the wheels are supported with respect to a veicle superstructure by spring means and in which the guide mewns is secured on the side of the wheel at a wheel carrier means and on the side of the vehicle at the superstructure, characterized in that the guide means absorbing shearing and tensional forces as well as lateral forces is pivotally supported at both the superstructure and wheel carrier means, to permit movement in rectilinear directions and in at least one curvilinear direction said wheel carrier means including a guide arm arranged at a distance with respect to the guide means, and said wheel carrier means being guided by said guide arm in a curved track means secured at the vehicle superstructure.

2. A wheel suspension according to claim 1, characterized in that the configuration of the curved track means is constructed corresponding to the intended use of the vehicle.

3. A wheel suspension according to claim 1, characterized in that the guide arm is guided in the curved track means by means of a sliding body.

4. A wheel suspension according to claim 3, characterized in that the wheel carrier means consists of lightweight metal.

5. A wheel suspension according to claim 3, characterized in that the curved track means secured at the vehicle superstructure is constitued by an independent housing which is detachably secured at the vehicle superstructure.

6. A wheel suspension for individually suspended wheels of motor vehicles guided by a guide means, in which the wheels are supported with respect to a vehicle superstructure by spring means and in which the guide means is secured on the side of the wheel at a wheel carrier means and on the side of the vehicle at the superstructure, characterized in that the guide means absorbing shearing and tensional forces as well as lateral forces is pivotally secured for universal movement at both the vehicle superstructure and the wheel carrier means, said wheel carrier means including a guide arm arranged at a distance with respect to the guide means, and said wheel carrier means being guided by said guide arm in a curved track means secured at the vehicle superstructure.

7. A wheel suspension for individually suspended wheels of motor vehicles guided by a guide means, in which the wheels are supported with respect to a vehicle superstructure by spring means and in which the guide means is secured on the side of the wheel at a wheel carrier means and on the side of the vehicle at the superstructure, characterized in that the guide means absorbing shearing and tensional forces as well as lateral forces is pivotally supported for substantially universal movement at least at one of the two parts consisting of superstructure and wheel carrier means, said wheel carrier means including a guide arm arranged at a distance with respect to the guide means, and said wheel carrier means being guided by said guide arm in a curved track means secured at the vehicle superstructure, said guide arm is guided in the curved track means by means of a sliding body, said guide arm of the wheel carrier means is constructed fork-shaped for receiving the sliding body and extends above the guide means toward the vehicle center, and means for supporting the sliding body in the fork-shaped guide arm including a bearing bolt.

8. A wheel suspension according to claim 7, characterized in that the bearing bolt is detachable.

9. A wheel suspension according to claim 7, characterized in that the sliding body is constructed as roller of at least partially spherical shape and consists of a synthetic material of the class of polyurethane.

10. A wheel suspension according to claim 9, characterized in that the curved track means secured at the vehicle superstructure is consti-tuted by an independent housing which is detachably secured at the vehicle superstructure.

11. A wheel suspension according to claim 10, characterized in that the housing of the curved track means is constructed two-partite, and the two halves thereof form the configuration of the curved track means and, placed against one another, receive therewithin the spherically shaped roller of the guide arm.

12. A wheel suspension according to claim 11, characterized in that the configuration of the curved track means is constructed corresponding to the intended use of the vehicle.

13. A wheel suspension according to claim 11, characterized in that the guide means includes an adjusting means for adjusting the toe-in, said adjusting means being arranged within the area of the wheel carrier means.

14. A wheel suspension according to claim 13, characterized in that the adjusting means includes a threaded member guided within the guide means substantially at right angle to the wheel axis, said threaded member being connected with an elastic bushing means and surrounding a portion of the wheel carrier means elastically supported in the guide means.

15. A wheel suspension according to claim 14, characterized in that the end of the guide means at the side of the superstructure is constructed Y-shaped and is elastically pivotally connected at a cross bearer means of the vehicle superstructure, the leg portions of the Y-shaped end of the guide means partially surrounding the cross bearer means.

16. A wheel suspension according to claim 15, characterized in that the elastic bearing support of the guide means at least at one of the two parts consisting of cross bearer means and the wheel carrier means is constituted by rubber elements under prestress.

17. A wheel suspension according to claim 16, characterized in that the elastic bearing support of the guide means at the cross-bearer means and at the wheel carrier means is constituted by rubber elements under prestress.

18. A wheel suspension according to claim 17, characterized in that the guide means is pivotally secured for universal movement at both the vehicle superstructure and the wheel carrier means.

19. A wheel suspension for individually suspended wheels of motor vehicles guided by a guide means, in which the wheels are supported with respect to a vehicle superstructure by spring means and in which the guide means is secured on the side of the wheel at a wheel carrier means and on the side of the vehicle at the superstructure, characterized in that the guide means absorbing shearing and tensional forces as well as lateral forces is pivotally supported for substantially universal movement at least at one of the two parts consisting of superstructure and wheel carrier means, said wheel carrier means including a guide arm arranged at a distance with respect to the guide means, and said wheel carrier means being guided by said guide arm in a curved track means secured at the vehicle superstructure, said guide means includes an adjusting means for adjusting the toe-in, said adjusting means being arranged within the area of the wheel carrier means.

20. A wheel suspension according to claim 19, characterized in that the adjusting means includes a threaded member guided within the guide means substantially at right angle to the wheel axis, said threated member being connected with an elastic bushing means and surrounding a portion of the wheel carrier means elastically supported in the guide means.

21. A wheel suspension for individually suspended wheels of motor vehicles guided by guide means, in which the wheels are supported with respect to a vehicle superstructure by spring means and in which the guide means is secured on the side of the wheel at a wheel carrier means and on the side of the vehicle at the superstructure, characterized in that the guide means absorbing shearing and tensional forces as well as lateral forces is pivotally supported for substantially universal movement at least at one of the two parts consisting of superstructure and wheel carrier means, end of the guide means at the side of the superstructure is constructed Y-shaped and is elastically pivotally connected at a cross bearer means of the vehicle superstructure, the leg portions of the Y-shaped end of the guide means partially surrounding the cross bearer means, said wheel carrier means including a guide arm arranged at a distance with respect to the guide means, and said wheel carrier means being guided by said guide arm in a curved track means secured at the vehicle superstructure.

22. A wheel suspension according to claim 21, characterized in that the elastic bearing support of the guide means at least at one of the two parts consisting of cross bearer means and the wheel carrier means is constituted by rubber elements under prestress.

23. A wheel suspension according to claim 21, characterized in that the elastic bearing support of the guide means at the cross-bearer means and at the wheel carrier means is constituted by rubber elements under prestess.

24. A wheel suspension for individually suspended wheels of motor vehicles guided by a guide means, in which the wheels are supported with respect to a vehicle superstructure by spring means and in which the guide means is secured on the side of the wheel at a wheel carrier means and on the side of the vehicle superstructure, characterized in that the guide means absorbing shearing and tensional forces as well as lateral forces is pivotally supported for substantially universal movement at least at one of the two parts consisting of superstructure and wheel carrier means, said wheel carrier means including a guide arm arranged at a distance with respect to the guide means, and said wheel carrier means being guided by said guide arm in a curved track means secured at the vehicle superstructure, said guide arm is guided in the curved track means by means of a sliding body, said sliding body is constructed as roller of at least partially spherical shape and consists of synthetic material of the class of polyurethane.

25. A wheel suspension for individually suspended wheels of motor vehicles guided by a guide means, in which the wheels are supported with respect to a vehicle superstructure by spring means and in which the guide means is secured on the side of the wheel at a wheel carrier means and on the side of the vehicle at the superstructure, characterized in that the guide means absorbing shearing and tensional forces as well as lateral forces is pivotally supported for substantially universal movement at least at one of the two parts consisting of superstructure and wheel carrier means, said wheel carrier means including a guide arm arranged at a distance with respect to the guide means, and said wheel carrier means being guided by said guide arm in a curved track means secured at the vehicle superstructure, said guide arm is guided in the curved track means by means of a sliding body, said sliding body is constructed as roller of at least partially spherical shape, said curved track means is constituted by an independent housing which is detachably secured at the vehicle superstructure, said housing is constructed two-partite, and the two halves thereof form the configuration of the curved tract means and, placed against one another, receive therewithin the spherically shaped roller of the guide arm.

* * * * *